/

US011159691B2

(12) United States Patent
Takahashi

(10) Patent No.: US 11,159,691 B2
(45) Date of Patent: Oct. 26, 2021

(54) ORIGINAL READING APPARATUS

(71) Applicant: CANON KABUSHIKI KAISHA, Tokyo (JP)

(72) Inventor: Toshio Takahashi, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/905,007

(22) Filed: Jun. 18, 2020

(65) Prior Publication Data

US 2020/0322488 A1    Oct. 8, 2020

Related U.S. Application Data

(63) Continuation of application No. PCT/JP2018/047013, filed on Dec. 20, 2018.

(30) Foreign Application Priority Data

Dec. 25, 2017  (JP) .............................. JP2017-248451

(51) Int. Cl.
*H04N 1/00*    (2006.01)
*G03B 27/62*    (2006.01)
(Continued)

(52) U.S. Cl.
CPC ........... *H04N 1/0083* (2013.01); *G03B 27/50* (2013.01); *G03B 27/62* (2013.01); *G03G 15/04* (2013.01); *H04N 1/1017* (2013.01)

(58) Field of Classification Search
CPC ............... H04N 1/0083; H04N 1/1017; H04N 1/00013; H04N 1/00018; H04N 1/00092;
(Continued)

(56) References Cited

U.S. PATENT DOCUMENTS 4,942,481 A *  7/1990  Yoshinouchi ........ H04N 1/0311
                                                          358/471
7,161,716 B1    1/2007  Kawasaki et al. ............ 358/497
(Continued)

FOREIGN PATENT DOCUMENTS

JP    S62-98343    5/1987
JP    H08-16064    1/1996
(Continued)

OTHER PUBLICATIONS

International Search Report and Written Opinion in counterpart PCT/JP2018/047013.
(Continued)

*Primary Examiner* — Negussie Worku
(74) *Attorney, Agent, or Firm* — Venable LLP

(57) ABSTRACT

An original reading apparatus includes: a reading unit configured to read an original placed on a platen while moving in a predetermined direction in a housing; a sensor provided in the housing and configured to detect presence of the original in a predetermined position on the platen to identify a size of the original; a holding member movable in the housing and configured to hold the sensor and a cable extending from the sensor; and a cover configured to cover a predetermined space on a rear side of the platen mounted to the housing. A grip portion used by an operator to move the holding member is provided at one end of the holding member extending to the predetermined space through an opening portion in a wall on a rear side of the housing. When the cover is removed, the operator is allowed to grip the grip portion.

11 Claims, 10 Drawing Sheets

(51) Int. Cl.
*H04N 1/10* (2006.01)
*G03B 27/50* (2006.01)
*G03G 15/04* (2006.01)

(58) Field of Classification Search
CPC .......................... H04N 1/00519–00679; H04N 1/00681–00761; H04N 1/00785–00827; H04N 1/00835; H04N 1/00909; H04N 1/024–0318; H04N 1/04–207; H04N 2201/024–04798; G03B 27/50; G03B 27/62; G03G 15/04
USPC ........................................................ 358/474
See application file for complete search history.

(56) References Cited

U.S. PATENT DOCUMENTS

| | | | | |
|---|---|---|---|---|
| 7,630,111 | B2* | 12/2009 | Miyanagi | G02B 26/127 359/197.1 |
| 7,843,611 | B2* | 11/2010 | Albahri | H04N 1/19594 358/474 |
| 8,900,130 | B2* | 12/2014 | Berglund | A61B 5/1079 600/109 |
| 9,332,143 | B2* | 5/2016 | Tamai | H04N 1/00557 |
| 10,594,881 | B2* | 3/2020 | Kikuchi | H04N 1/00737 |
| 2005/0099658 | A1* | 5/2005 | Chen | H04N 1/024 358/474 |
| 2006/0083564 | A1* | 4/2006 | Yazawa | H04N 1/00519 399/363 |
| 2011/0051200 | A1* | 3/2011 | Iwasaki | H04N 1/1215 358/474 |
| 2011/0292465 | A1* | 12/2011 | Sugiyama | H04N 1/00713 358/474 |
| 2013/0321880 | A1* | 12/2013 | Takahashi | H04N 1/195 358/482 |
| 2017/0251123 | A1* | 8/2017 | Kawamata | H04N 1/1043 |
| 2018/0183958 | A1* | 6/2018 | Ishii | H04N 1/00708 |
| 2020/0036854 | A1* | 1/2020 | Kawasaki | H04N 1/00559 |

FOREIGN PATENT DOCUMENTS

| | | |
|---|---|---|
| JP | 2011-250029 | 12/2011 |
| JP | 5676188 B | 2/2015 |
| JP | 2016-158068 | 9/2016 |

OTHER PUBLICATIONS

English translation of International Search Report and Written Opinion in counterpart PCT/JP2018/047013.

* cited by examiner

ORIGINAL READING APPARATUS

CROSS-REFERENCE TO RELATED APPLICATIONS

This application is a Continuation of International Patent Application No. PCT/JP2018/047013, filed Dec. 20, 2018, which claims the benefit of Japanese Patent Application No. 2017-248451, filed Dec. 25, 2017, both of which are hereby incorporated by reference herein in their entirety.

BACKGROUND OF THE INVENTION

Field of the Invention

The present invention relates to an original reading apparatus configured to read an image of an original placed on an original platen.

Description of the Related Art

Hitherto, original reading apparatus (hereinafter also referred to as "image reading apparatus") have been configured to read an image of an original placed on an original platen glass. FIG. 14 is a perspective view for illustrating a related-art image reading apparatus 80. The image reading apparatus 80 includes a transparent original platen glass 801 on which an original is to be placed, and a scanning unit 802 that is movable in a movement direction MD under the original platen glass 801. In general, the image reading apparatus 80 is configured to automatically detect a size of an original placed on the original platen glass 801. Size standards of an original include standards of A series, B series, and inch series. The image reading apparatus 80 includes a plurality of reflective optical sensors 811 and 812 arranged on a main body frame 804 below the original platen glass 801 so as to read even originals having sizes of different size standards (Japanese Patent No. 5676188).

However, the provision of the plurality of reflective optical sensors 811 and 812 in the image reading apparatus 80 leads to a problem of high cost. To address the problem, when a ship-to destination of the image reading apparatus 80 has already been determined, one reflective optical sensor is provided at a position determined in accordance with a size standard of an original required at the ship-to destination, to thereby save cost. Meanwhile, in some cases, a user may use the image reading apparatus 80 to read an original having a size of a standard other than the standard required at the ship-to destination. In this case, there is a risk in that the image reading apparatus 80 fails to accurately detect the size of the original, and then automatically selects a sheet of a size unsuitable for formation of the read image. As a result, the following problem arises: a part of the image to be formed on the sheet is missing, or the image is formed on a sheet larger than needed. In order to solve this problem, it is required to install additional reflective optical sensors or change a position to arrange the reflective optical sensor.

However, in a case of installing additional reflective optical sensors or changing a position to arrange the reflective optical sensor, a staff member in a service department is required to travel on business to the ship-to destination and remove the original platen glass 801 from the image reading apparatus 80 to perform operation. This leads to a problem of travel expense for the staff member in the service department. Further, removing the original platen glass 801 from the image reading apparatus 80 to perform the operation involves operations of removing and mounting other related components, which results in a problem of increasing an operation time.

SUMMARY OF THE INVENTION

In view of the above, it is an object of the present invention to allow a sensor, which is provided in a housing and is configured to detect presence or absence of an original in a predetermined position on an original platen to identify a size of an original, to be easily arranged in another position.

An original reading apparatus according to one embodiment of the present invention, comprises:

an original platen on which an original is to be placed;

a reading unit configured to read the original placed on the original platen while moving in a predetermined direction in a housing;

a sensor, which is provided in the housing, and is configured to detect presence or absence of the original in a predetermined position on the original platen to identify a size of the original;

a holding member configured to hold the sensor and a cable extending from the sensor; and a cover configured to cover a predetermined space on a rear side of the original platen, wherein the original platen is mounted to the housing, the holding member is movable in the housing, a grip portion used by an operator to move the holding member is provided at one end of the holding member, the one end extending to the predetermined space through an opening portion in a wall on a rear side of the housing, the predetermined space is located on a rear side of the wall, when the cover is removed, the operator is allowed to grip the grip portion, and the cable extends from the one end of the holding member to the predetermined space.

Further features of the present invention will become apparent from the following description of exemplary embodiments with reference to the attached drawings.

DESCRIPTION OF THE EMBODIMENTS

First Embodiment (Image Reading Apparatus)

Figure 1A:
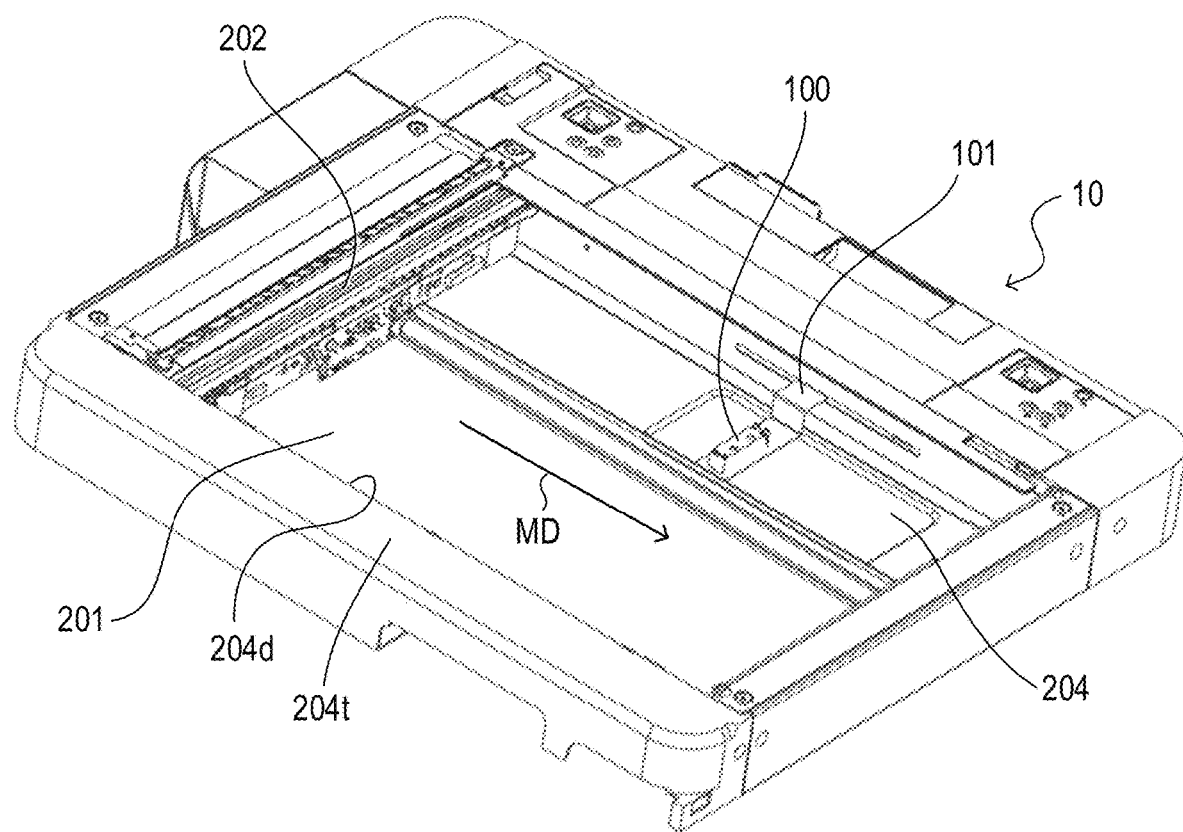
FIG. 1A is a perspective view for illustrating an image reading apparatus of a first embodiment of the present invention.
Figure 1B:
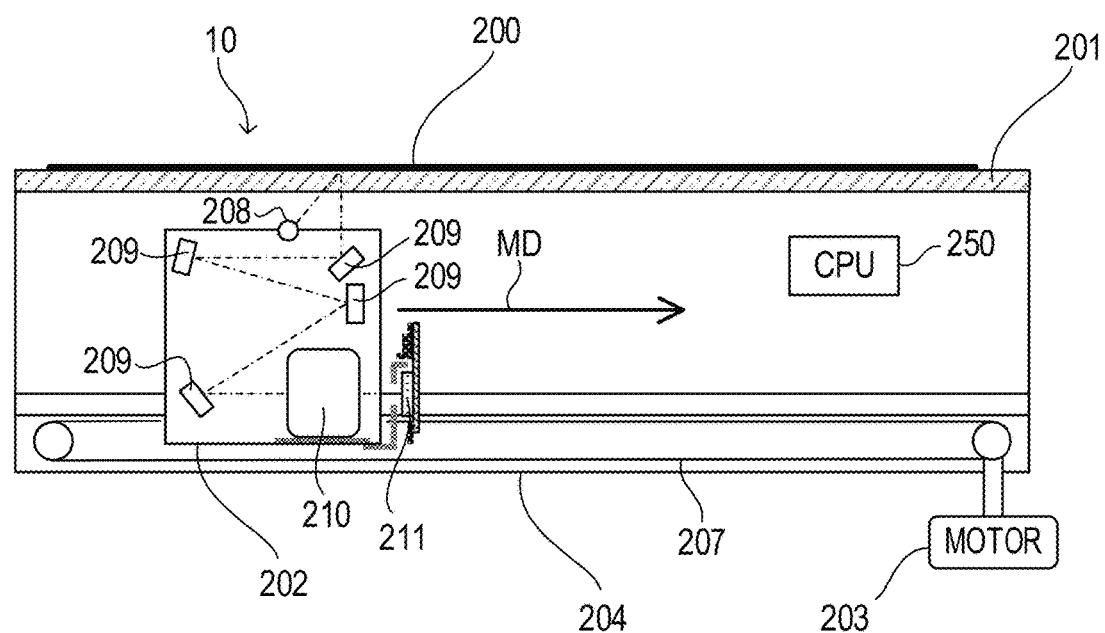
FIG. 1B is a sectional view for illustrating the image reading apparatus of the first embodiment.

FIG. 1A and FIG. 1B are views for illustrating an original reading apparatus (hereinafter referred to as "image reading apparatus") 10 according to a first embodiment of the present invention. The image reading apparatus 10 can be used alone as an image scanner, but may be incorporated in an image forming apparatus such as a copying machine or a multifunction printer. FIG. 1A is a perspective view for illustrating the image reading apparatus 10. FIG. 1B is a sectional view for illustrating the image reading apparatus 10. The image reading apparatus 10 includes a platen glass (hereinafter referred to as "original platen glass") 201, a reading unit (hereinafter referred to as "scanning unit") 202, and a driving device (hereinafter referred to as "motor") 203. As illustrated in FIG. 1B, an original 200 is placed on the original platen glass 201. The scanning unit 202 is provided below the original platen glass 201. The motor 203 is configured to move the scanning unit 202 in a sub-scanning direction (hereinafter referred to as "movement direction") MD through use of a belt 207. The scanning unit 202 is configured to read an image of the original 200 placed on the original platen glass 201 while being moved by the motor 203 in the movement direction (predetermined direction) MD. The original placed on the original platen glass 201 is pressed against the original platen glass 201 by a pressure plate (not shown).

The scanning unit 202 is a reading unit of a reduction-type optical system including a light source 208, a plurality of reflecting mirrors 209, a lens 210, and an image pickup element (hereinafter referred to as "image sensor") 211. The light source 208 being an illumination unit is configured to irradiate the original 200 placed on the original platen glass 201 with light. The plurality of reflecting mirrors 209 are configured to guide reflected light from the original 200 to the lens 210. The lens 210 is configured to focus the reflected light to form an image on the image sensor 211. The image sensor 211 includes a CCD or a CMOS. The image sensor 211 is configured to output an electric signal in accordance with an amount of received light. A CPU 250 being a control unit is configured to generate image data based on the electric signal output from the image sensor 211. The scanning unit 202 is not limited to the reading device of the reduction-type optical system and may be a reading device of a contact-type optical system (contact image sensor). For example, the scanning unit 202 may include a line image sensor extending in a main scanning direction orthogonal to the movement direction MD.

In the image reading apparatus 10, there is provided one reflective optical sensor 100 being a size detector (size detection sensor) configured to detect a size of the original 200 placed on the original platen glass 201. The reflective optical sensor 100 is held by a holding member 101. The holding member 101 is mounted to a housing (hereinafter referred to as "main body frame") 204 of the image reading apparatus 10. The original platen glass 201 is mounted to the main body frame 204 so as to cover an opening 204d at a top portion 204t of the main body frame 204.

On a rear side of the main body frame 204, there is mounted a substrate having mounted thereon electronic components for controlling the image sensor 211, the reflective optical sensor 100, and other components. Further, a cover is mounted so as to cover a space including a substrate portion. The cover may be formed of a single member or a plurality of members.

Figure 2A:
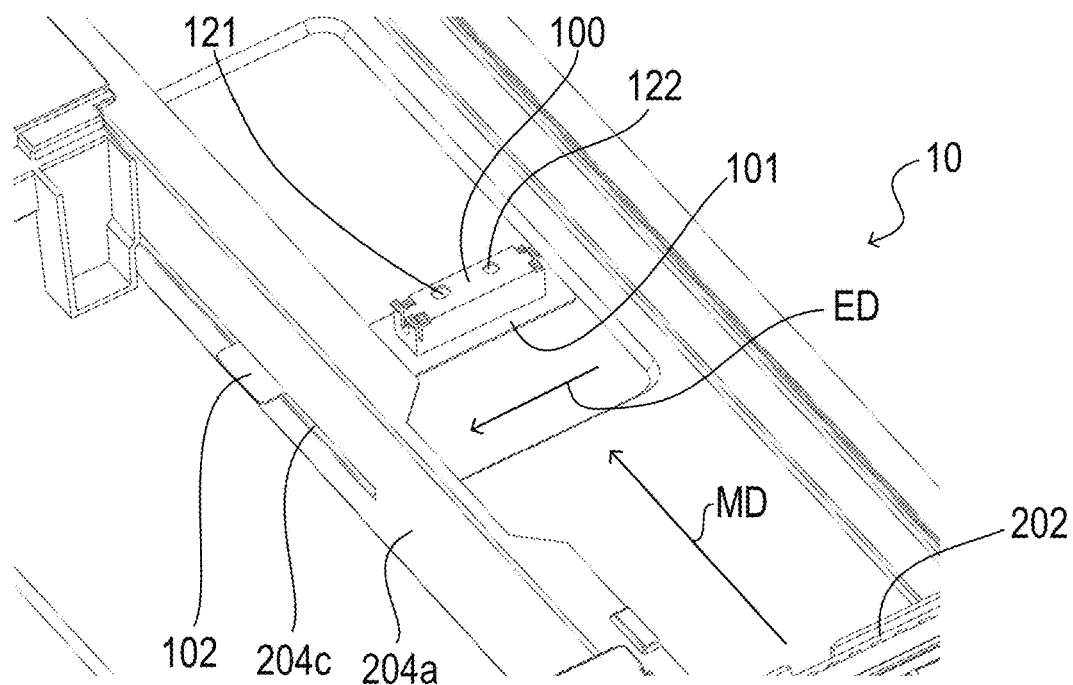
FIG. 2A is a perspective view for illustrating a reflective optical sensor provided in the image reading apparatus of the first embodiment.
Figure 2B:
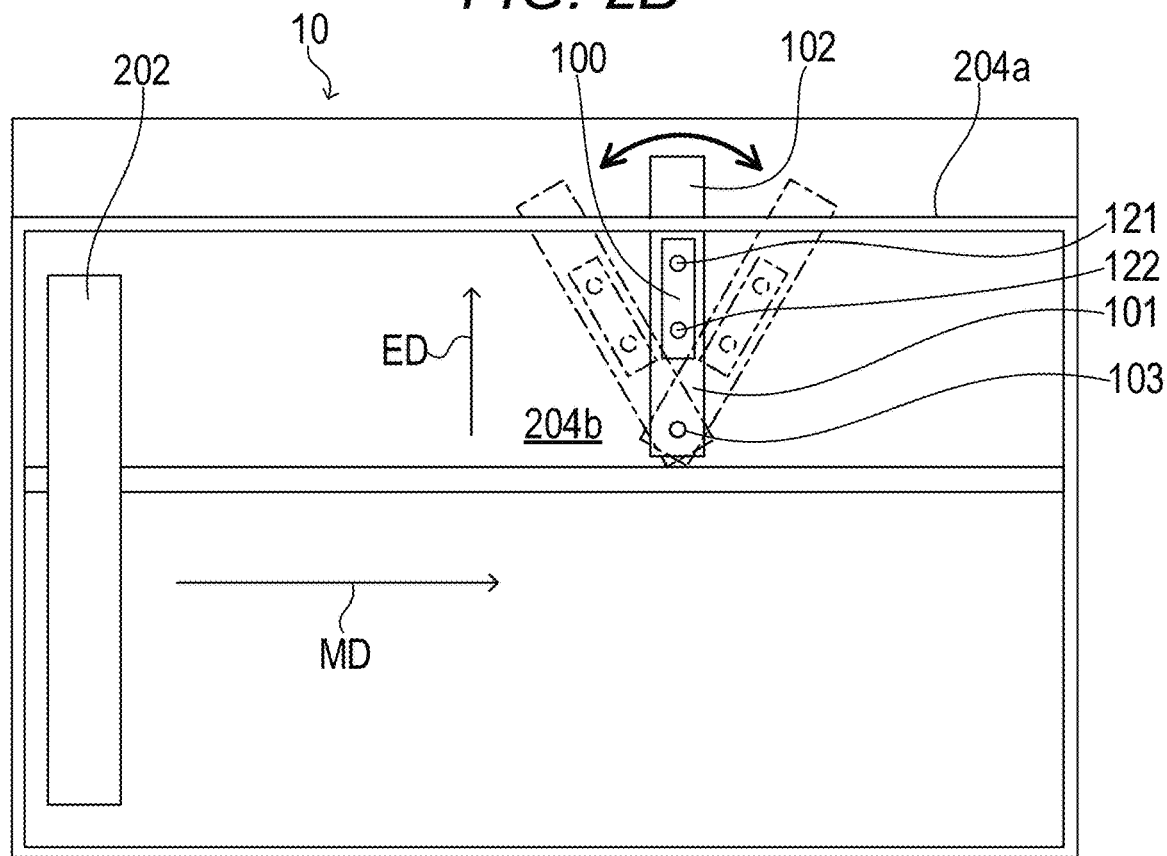
FIG. 2B is a plan view for illustrating the reflective optical sensor provided in the image reading apparatus of the first embodiment.

With this structure, the scanning unit 202 moves inside the housing having a bottom portion 204b of the main body frame 204 and a plurality of side walls provided upright on the bottom portion 204b (FIG. 2B). A side wall 204a (FIG. 2A and FIG. 2B) of the plurality of side walls is located on the rear side of the housing. In this specification, a side on which the cover is provided in the main scanning direction is defined as "rear side", and an opposite side thereof is defined as "front side".

(Reflective Optical Sensor)

FIG. 2A and FIG. 2B are views for illustrating the reflective optical sensor 100 provided in the image reading apparatus 10 of the first embodiment. FIG. 2A is a perspective view for illustrating the reflective optical sensor 100 provided in the image reading apparatus 10 of the first embodiment. FIG. 2B is a plan view for illustrating the reflective optical sensor 100 provided in the image reading apparatus 10 of the first embodiment. The reflective optical sensor 100 is accommodated in the main body frame 204 of the image reading apparatus 10. The reflective optical sensor 100 includes a light emitting portion 121 and a light receiving portion 122. The light emitting portion 121 is configured to emit an infrared light beam. The light receiving portion 122 is configured to receive the infrared light beam reflected by the original 200. The reflective optical sensor 100 uses the light emitting portion 121 to emit an infrared light beam, and uses the light receiving portion 122 to receive reflected light from the original 200 placed on the original platen glass 201. The reflective optical sensor 100 is configured to detect the presence or absence of the original 200 in a predetermined position being a target measurement position, in accordance with an amount of light received by the light receiving portion 122. The CPU 250 is configured to detect a size of the original 200 based on a result of the detection as to the presence or absence of the original 200 by the reflective optical sensor 100.

A size of the original 200 in the main scanning direction is determined based on an image signal output from the image sensor 211. Then, a size of the original is determined based on the size in the main scanning direction and a result of the detection by the reflective optical sensor 100.

(Holding Member)

The holding member 101 is formed of a sheet metal material. When the position of the reflective optical sensor 100 is to be adjusted, the holding member 101 can be moved in the movement direction MD by being operated from outside the main body frame 204. The holding member 101 is configured to secure the reflective optical sensor 100 adjusted to a predetermined position. The holding member 101 extends in a direction ED crossing the movement direction MD of the scanning unit 202. One end portion of the holding member 101 extends to an outside of the main body frame 204 through an opening portion 204c formed in the side wall 204a of the main body frame 204. At the one end portion of the holding member 101, a grip portion 102 is provided as an exposed portion that is exposed to the outside of the main body frame 204. As illustrated in FIG. 2B, the holding member 101 has a rotary shaft 103 held on the bottom portion 204b of the main body frame 204. The holding member 101 is rotatable about the rotary shaft 103. A user, or an operator, can grip the grip portion 102 of the holding member 101 to rotate the holding member 101 about the rotary shaft 103 in a direction indicated by the arrow of FIG. 2B, to thereby change the position of the reflective optical sensor 100. After fine adjustment of the reflective optical sensor 100 to a set position, the holding member 101 may be fixed by any suitable fixing member. The reflective optical sensor 100 is secured in the set position.

In general, size standards of the original 200 are roughly classified in accordance with countries (regions). In Japan, size standards of A series and B series are applied. In Europe, the size standard of A series is mainly applied. In North America, a size standard of inch series, for example, a letter size or a legal size is mainly applied. For example, when the reflective optical sensor 100 is placed in a position for detecting the original 200 of the size standard of A series in accordance with specifications at a ship-to destination of the image reading apparatus 10, the image reading apparatus 10 has difficulty in accurately detecting a size of the original of the standard of inch series. According to the first embodiment, however, in a case in which originals of the standard of inch series are mainly applied in the image reading apparatus 10, the user can grip the grip portion 102 of the holding member 101 to change the position of the reflective optical sensor 100 relative to the main body frame 204. With this structure, the image reading apparatus 10 can accurately detect the size of an original of the standard of inch series. The image reading apparatus 10 is only required to include one reflective optical sensor 100, and hence cost can be saved. Further, it is possible to change the position of the reflective optical sensor 100 without removing the original platen glass 201 from the image reading apparatus 10. Therefore, an operation time for changing the position of the reflective optical sensor 100 is shortened, thereby improving maintainability. According to the first embodiment, it is possible to save cost of the image reading apparatus 10 and also improve the maintainability.

Second Embodiment

Figure 3:
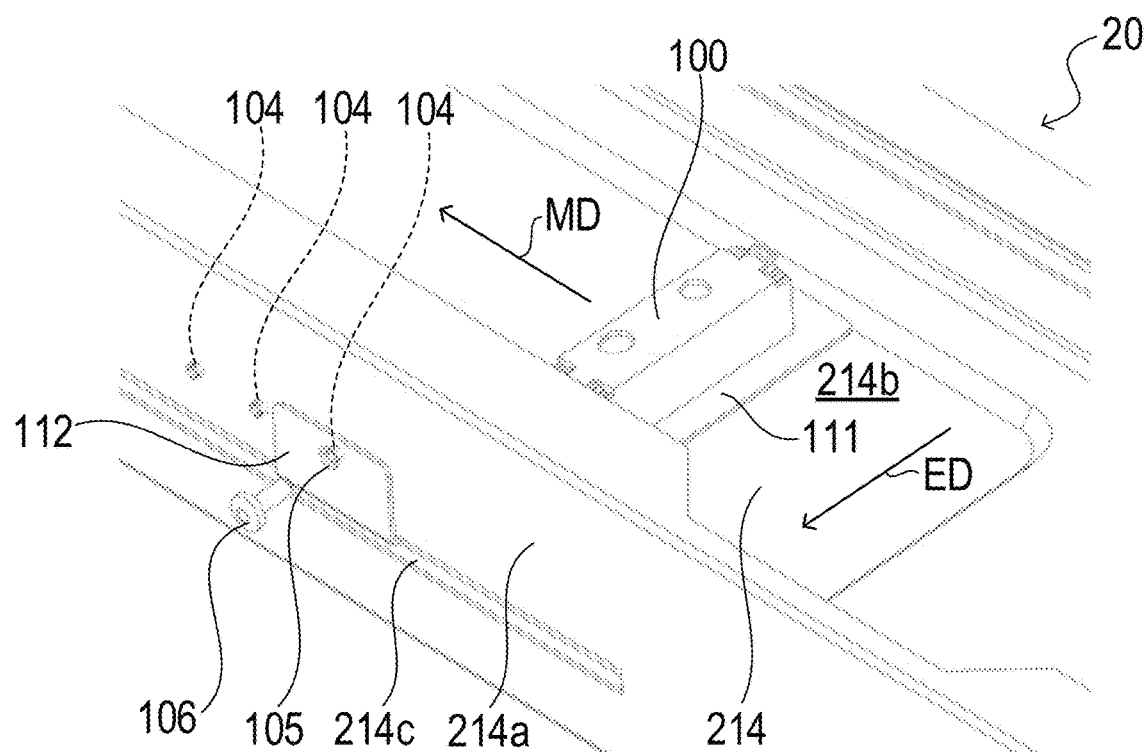
FIG. 3 is a perspective view for illustrating a holding member provided in an image reading apparatus of a second embodiment of the present invention.

With reference to FIG. 3, a second embodiment of the present invention is described below. In the second embodiment, the same structures as those of the first embodiment are denoted by the same reference symbols, and descriptions thereof are omitted. An image reading apparatus 20 of the second embodiment has substantially the same structure as that of the image reading apparatus 10 of the first embodiment except a holding member 111 described below, and hence a description thereof is omitted. The reflective optical sensor 100 of the second embodiment has substantially the same structure as that of the first embodiment, and hence a description thereof is omitted.

(Holding Member)

FIG. 3 is a perspective view for illustrating the holding member 111 provided in the image reading apparatus 20 of the second embodiment. The holding member 111 is formed of a sheet metal material. The holding member 111 is provided so as to be movable in parallel to the movement direction MD of the scanning unit 202 relative to a bottom portion 214b of a main body frame 214 in the image reading apparatus 20 while holding the reflective optical sensor 100. The holding member 111 extends in the direction ED crossing the movement direction MD of the scanning unit 202. One end portion of the holding member 111 extends to an outside of the main body frame 214 through an opening portion 214c formed in a side wall 214a of the main body frame 214. At the one end portion of the holding member 111, a grip portion 112 extending to the outside of the main body frame 214 is provided. The grip portion 112 has a surface portion that is bent perpendicularly to the holding member 111 to face the side wall 214a of the main body frame 214. The grip portion 112 has a through hole 105. On the other hand, the main body frame 214 has a plurality of screw holes 104 being a plurality of fixing portions. The plurality of screw holes 104 are formed side by side along the movement direction MD of the scanning unit 202.

The reflective optical sensor 100 is moved in accordance with a desired size standard, and the through hole 105 of the grip portion 112 is aligned with a corresponding screw hole 104, and then a screw 106 is screwed into the screw hole 104 through the through hole 105. With the surface portion of the grip portion 112 being fixed to the side wall 214a of the main body frame 214 with the screw 106, the reflective optical sensor 100 is secured in a position corresponding to the desired size standard. Through an operation of changing the screw hole 104 for fixing the grip portion 112, the position of the reflective optical sensor 100 can be easily changed. The reflective optical sensor 100 is secured accurately in a desired position with respect to the main body frame 214 in the movement direction MD being a sub-scanning direction.

In the second embodiment, the screw 106 and the plurality of screw holes 104 are used as the fixing portions for fixing the holding member 111 in a position corresponding to a desired size standard. However, the fixing portions are not limited thereto, and a plurality of fixing portions to be engaged with the grip portion 112 may be provided in the main body frame 214 so that the grip portion 112 is snap-fit to any fixing portion due to its elasticity.

According to the second embodiment, it is possible to align the through hole 105 formed in the grip portion 112 of the holding member 111 for holding the reflective optical sensor 100 with any one of the plurality of screw holes 104 formed in the main body frame 214 in accordance with a size standard, and then fix the holding member 111 with the screw 106. Accordingly, it is possible to easily perform the positional alignment for the reflective optical sensor 100 in accordance with a size standard. According to the second embodiment, it is possible to save cost of the image reading apparatus 20 and also improve maintainability.

Figure 4:
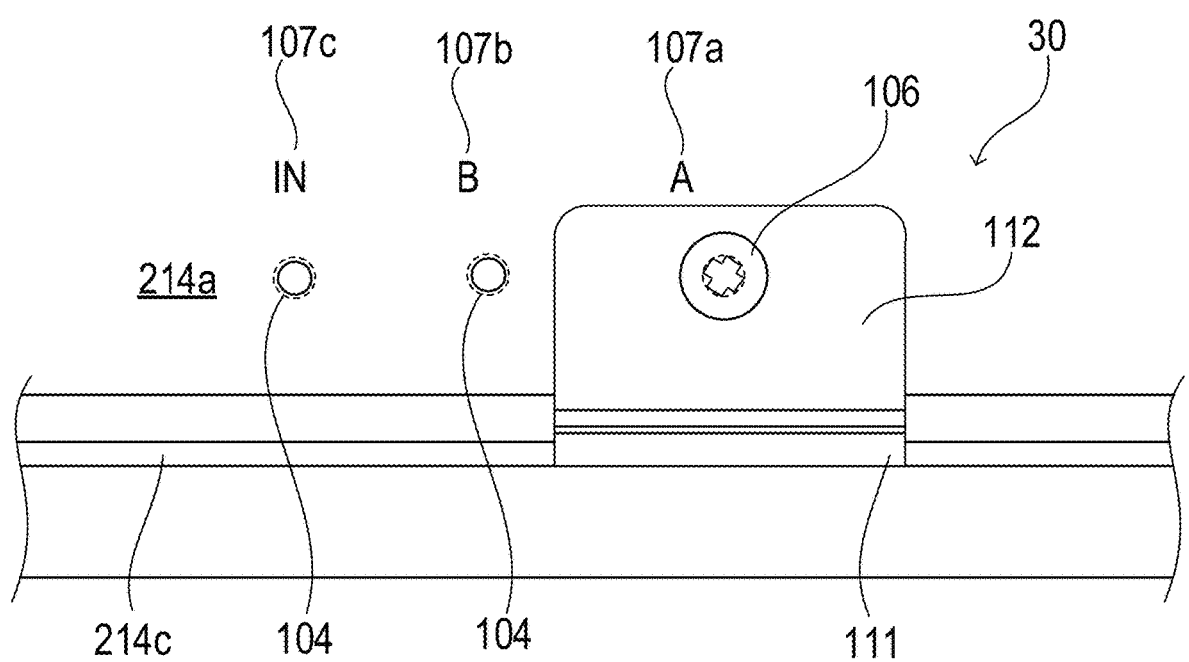
FIG. 4 is a view for illustrating side walls of a main body frame in a modification example of the second embodiment.

With reference to FIG. 4, a modification example of the second embodiment is described below. FIG. 4 is a view for illustrating the side wall 214a of the main body frame 214 in an image reading apparatus 30 of the modification example of the second embodiment. In the vicinities of the plurality of screw holes 104 formed in the side wall 214a, an indication "A" 107a indicating the size standard of A series, an indication "B" 107b indicating the size standard of B series, and an indication "IN" 107c indicating the standard of inch series are provided. Thus, a user can easily set the reflective optical sensor 100 to a position corresponding to a desired size standard.

In the mode illustrated in FIG. 4, there are formed, in the vicinities of the plurality of screw holes 104, the indications 107 given in a printed or impressed form indicating size standards of an original corresponding to the plurality of screw holes 104, respectively. Thus, the user can easily move the reflective optical sensor 100 to a position corresponding to a desired size standard. According to the modification example of the second embodiment, it is possible to save cost of the image reading apparatus 30 and also improve maintainability.

(Maintenance Cover)

Figure 5:
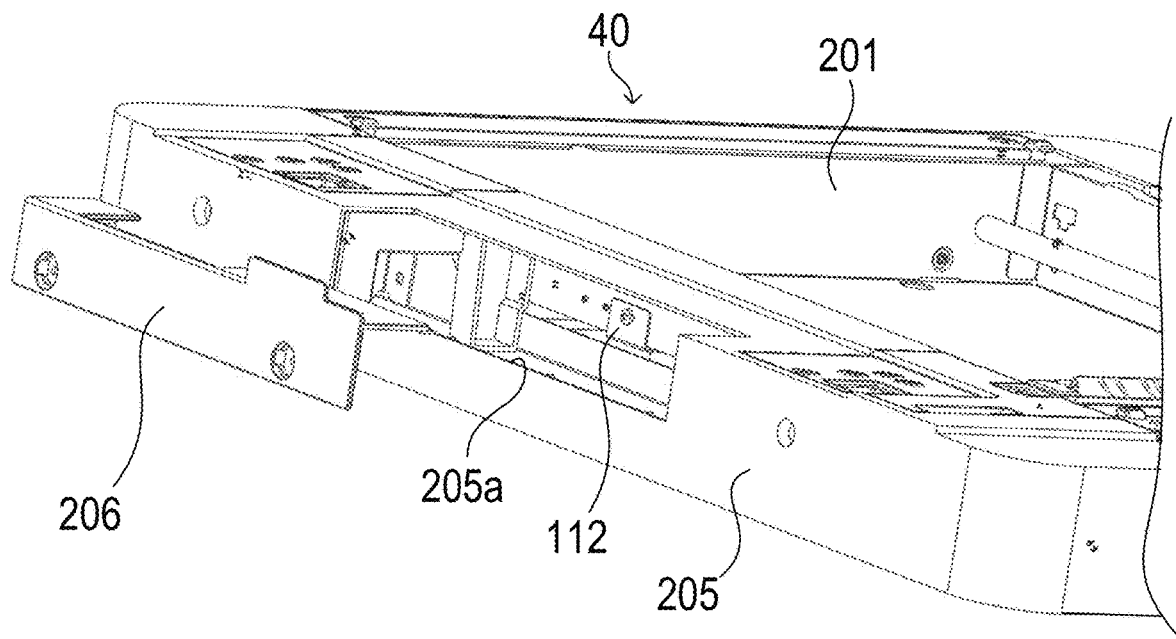
FIG. 5 is a partial perspective view for illustrating an image reading apparatus of a modification example of the second embodiment.

FIG. 5 is a partial perspective view for illustrating an image reading apparatus 40. The image reading apparatus 40 includes an exterior cover 205 and a maintenance cover 206 provided separately from the exterior cover 205. The exterior cover 205 has an opening 205a for allowing access to the grip portion 112 of the holding member 111. The maintenance cover 206 is mounted to the exterior cover 205 so as to cover the opening 205a of the exterior cover 205. The maintenance cover 206 can open and close the opening 205a of the exterior cover 205. The maintenance cover 206 may be removably mounted to the exterior cover 205. Through an operation of opening the maintenance cover 206, the user can grip the grip portion 112 of the holding member 111 without removing the original platen glass 201 from the image reading apparatus 40. The user can grip the grip portion 112 to move the reflective optical sensor 100 to a position corresponding to a desired size standard. That is, it is possible to improve maintainability through changing the position of the reflective optical sensor 100 by the user.

Figure 6:
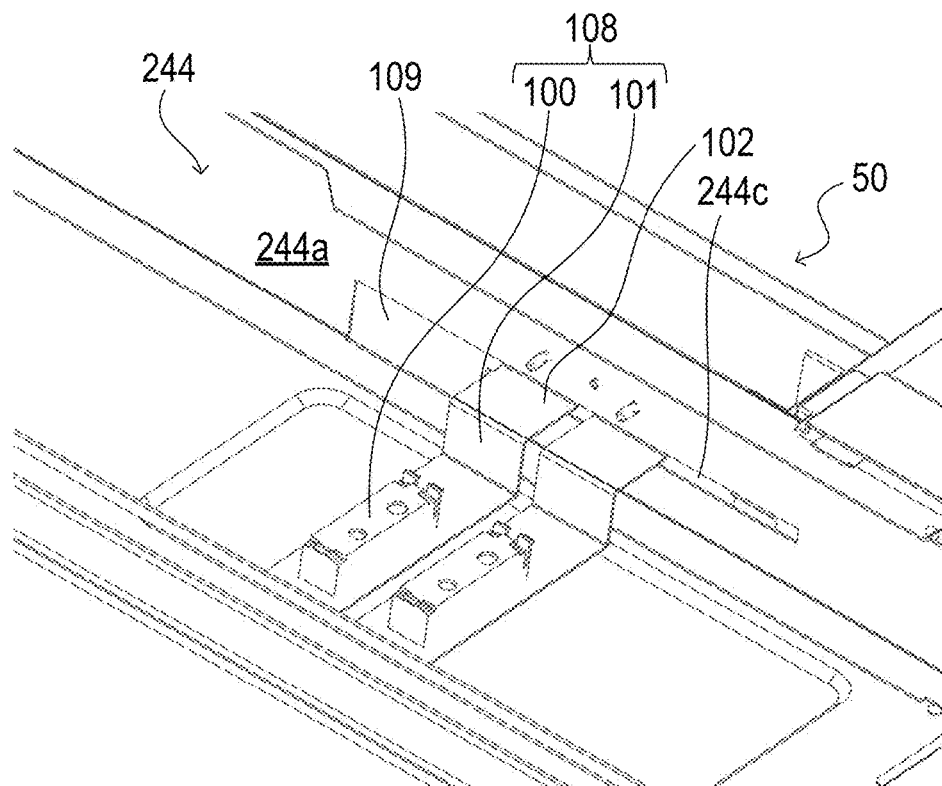
FIG. 6 is a perspective view for illustrating a plurality of size detectors provided in an image reading apparatus of a modification example of the second embodiment.

With reference to FIG. 6, a modification example of the second embodiment is described below. A description of the same structure as that of the second embodiment is omitted. FIG. 6 is a perspective view for illustrating a plurality of size detectors 108 provided in an image reading apparatus 50. Some users desire to enable accurate detection of original sizes of both the size standards of A series and inch series (in a non-exclusive manner). In this case, a plurality of reflective optical sensors 100 are provided. In the second embodiment, an insertion port 109 is formed to communicate with an opening portion 244c formed in a side wall 244a of a main body frame 244 in the image reading apparatus 50. Each size detector 108 including the reflective optical sensor 100 and the holding member 101 which are integrated with each other is inserted into the main body frame 244 through the insertion port 109. Each reflective optical sensor 100 is placed inside the main body frame 244. The grip portion 102 of the holding member 101 extends to an outside of the main body frame 244 through the opening portion 244c. Each size detector 108 can be placed inside the image reading apparatus 50 through the insertion port 109 without removing the original platen glass 201 from the image reading apparatus 50, and hence it is possible to easily install additional reflective optical sensors 100.

Third Embodiment

With reference to FIG. 7A to FIG. 13, a third embodiment of the present invention is described below. In the third embodiment, the same structures as those of the first and second embodiments are denoted by the same reference symbols, and descriptions thereof are omitted. Further, a reflective optical sensor 300 of the third embodiment has substantially the same structure as the reflective optical sensor 100 of the first embodiment, and hence a description thereof is omitted.

Figure 7A:
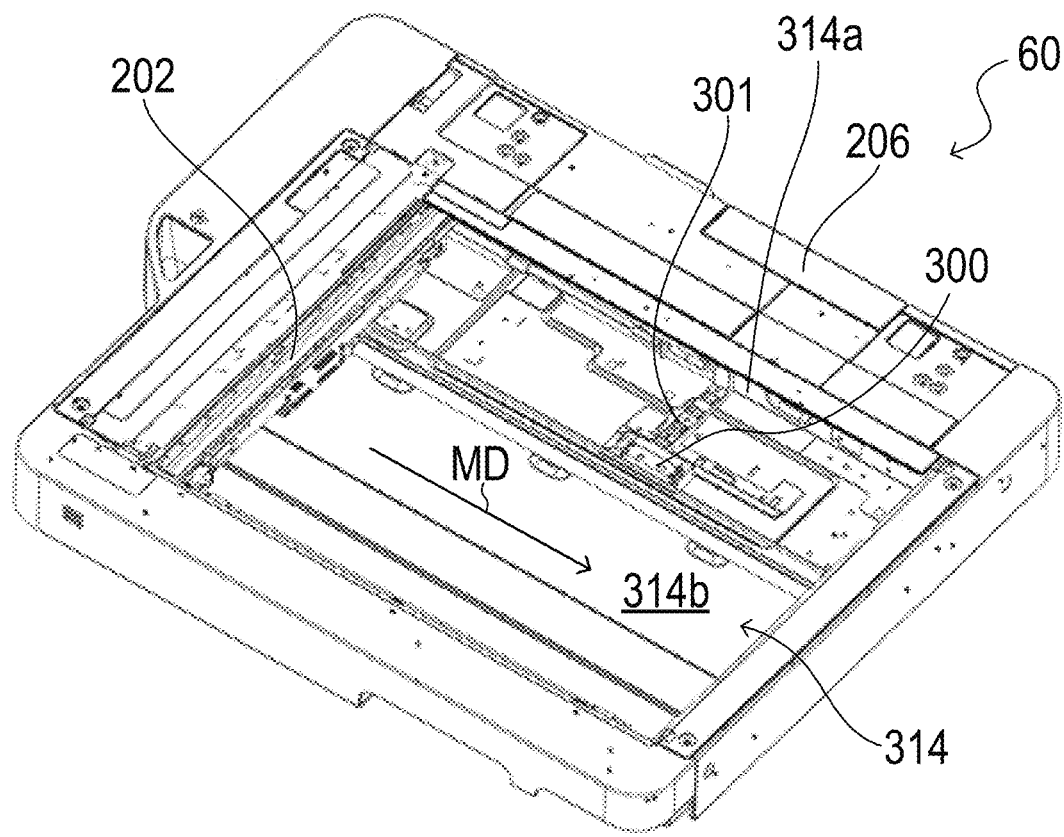
FIG. 7A is a perspective view for illustrating an image reading apparatus of a third embodiment of the present invention.

On a rear side of a main body frame 314, there is mounted a substrate 403 (FIG. 9) having mounted thereon electronic components for controlling the image sensor 211, a reflective optical sensor 300, and other components. Further, a cover is mounted so as to cover a space including a substrate portion. The cover may be formed of a single member or a plurality of members. In this embodiment, the cover includes a plurality of covers inclusive of the maintenance cover 206 (FIG. 7A). With this structure, the scanning unit 202 moves inside a housing having a bottom portion 314b of the main body frame 314 and a plurality of side walls provided upright on the bottom portion 314b. A side wall 314a (FIG. 7A and FIG. 7B) of the plurality of side walls is located on the rear side of the housing. A side on which the cover is provided in the main scanning direction is defined as "rear side", and an opposite side thereof is defined as "front side".

Figure 7B:
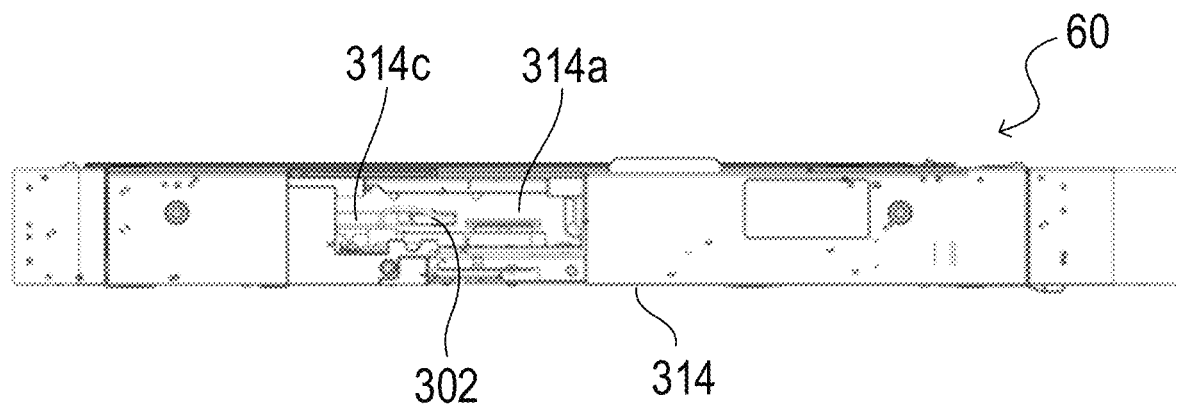
FIG. 7B is a back view for illustrating the image reading apparatus of the third embodiment.
Figure 8:
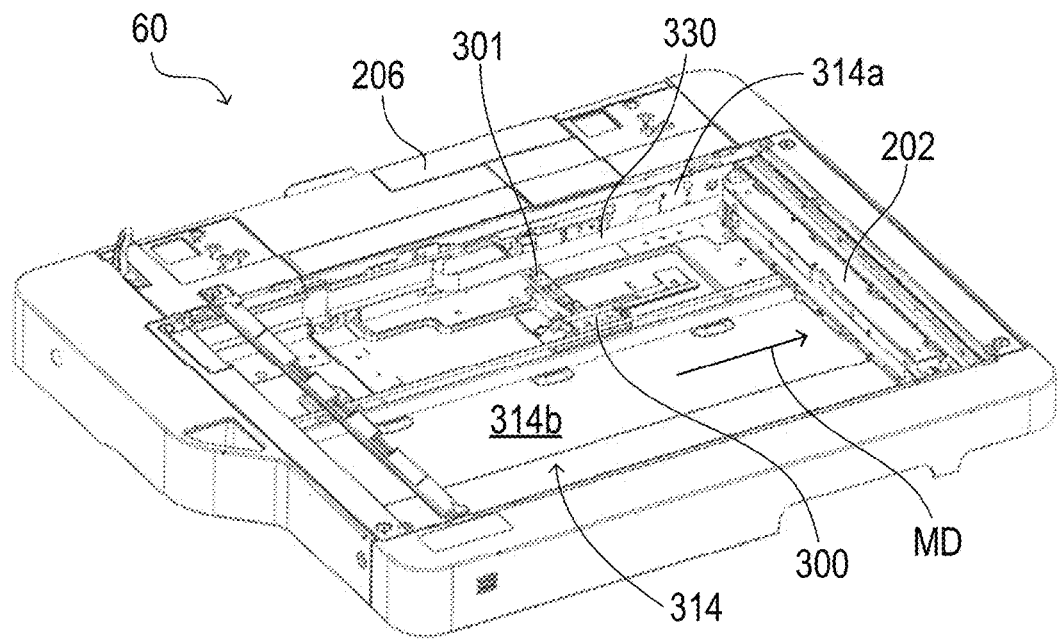
FIG. 8 is a view for illustrating the image reading apparatus of the third embodiment in a case in which a scanning unit is located on a downstream side in a movement direction.

FIG. 7A is a perspective view for illustrating an image reading apparatus 60 of the third embodiment. The scanning unit 202 is located on an upstream side in the movement direction MD. FIG. 8 is a view for illustrating the image reading apparatus 60 in a case in which the scanning unit 202 is located on a downstream side in the movement direction MD. The scanning unit is movable in the movement direction inside the housing. A flat cable 330 is connected to the scanning unit 202 and to the substrate 403 (see FIG. 9) provided on the rear side of the image reading apparatus. The flat cable 330 is configured to transmit a control signal for controlling the scanning unit 202 and an image signal output from the image sensor 211. FIG. 7B is a back view for illustrating the image reading apparatus 60 in a state in which the maintenance cover 206 is removed.

Figure 9:
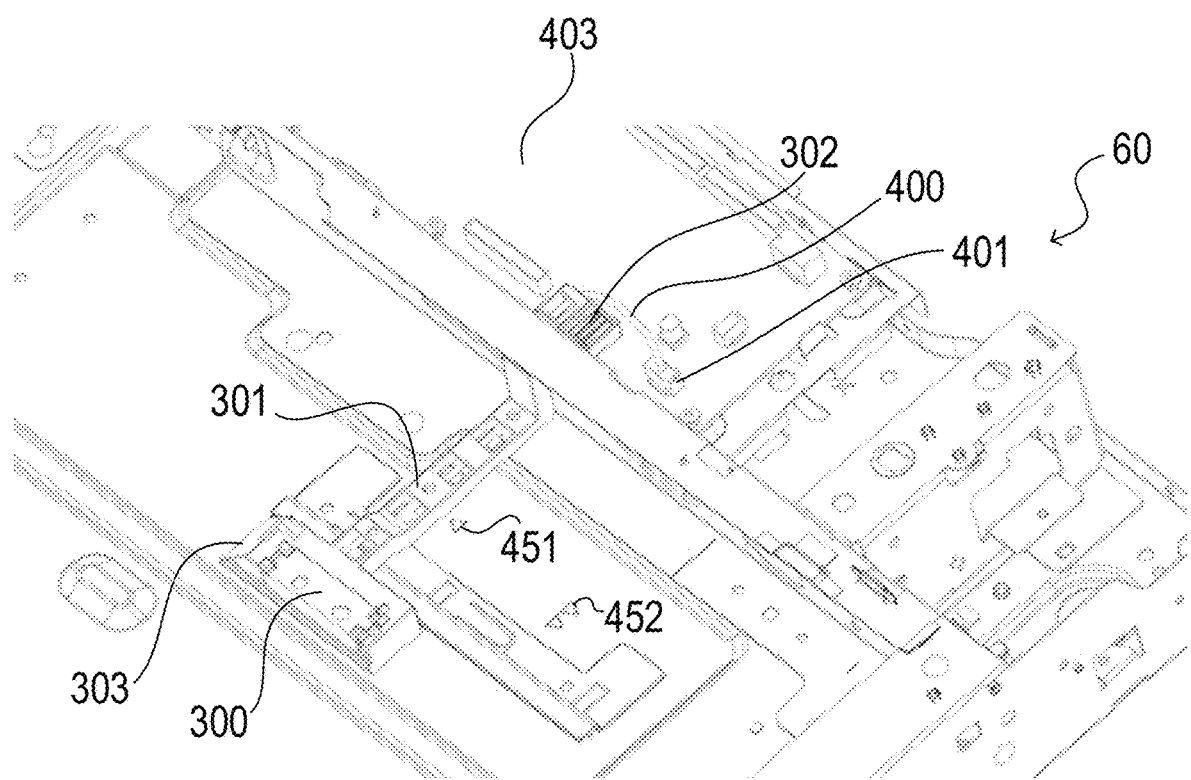
FIG. 9 is a perspective view for illustrating a holding member provided in the image reading apparatus of the third embodiment.
Figure 10:
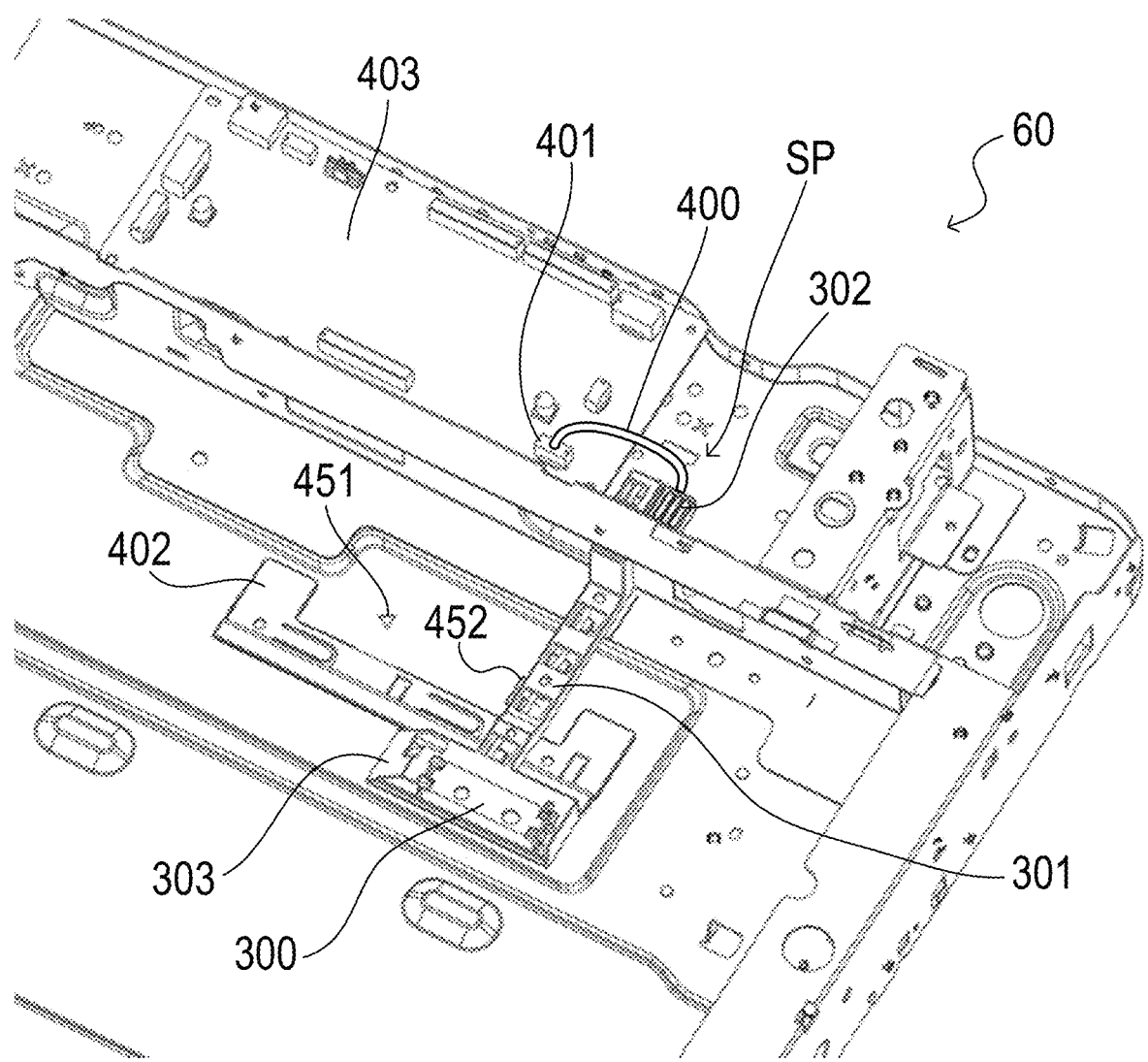
FIG. 10 is a perspective view for illustrating the holding member provided in the image reading apparatus of the third embodiment.
Figure 11A:
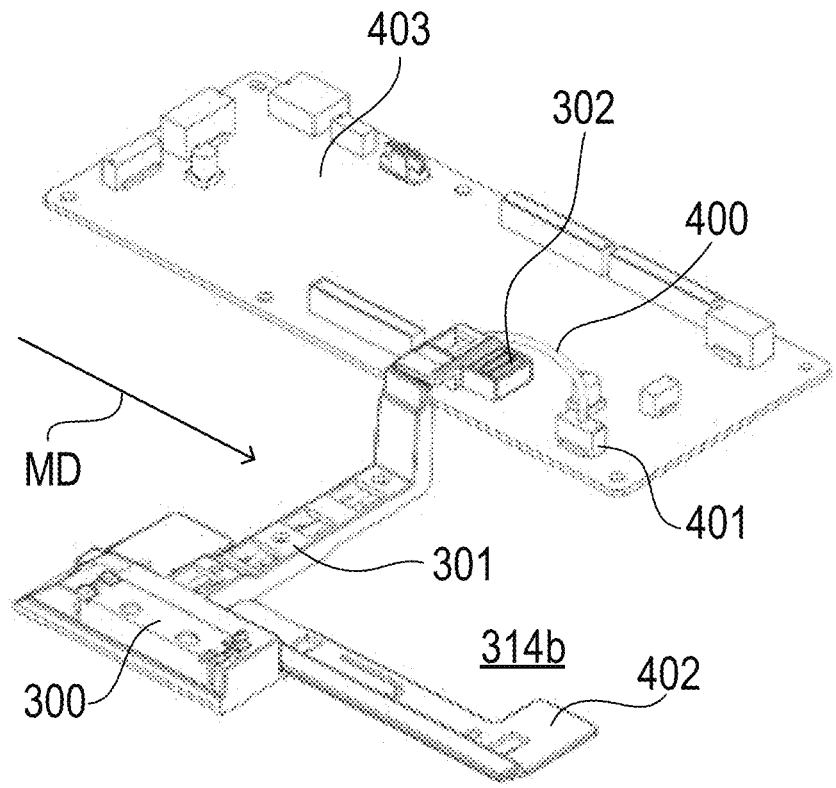
FIG. 11A is a perspective view for illustrating the holding member and a substrate in the third embodiment.
Figure 11B:
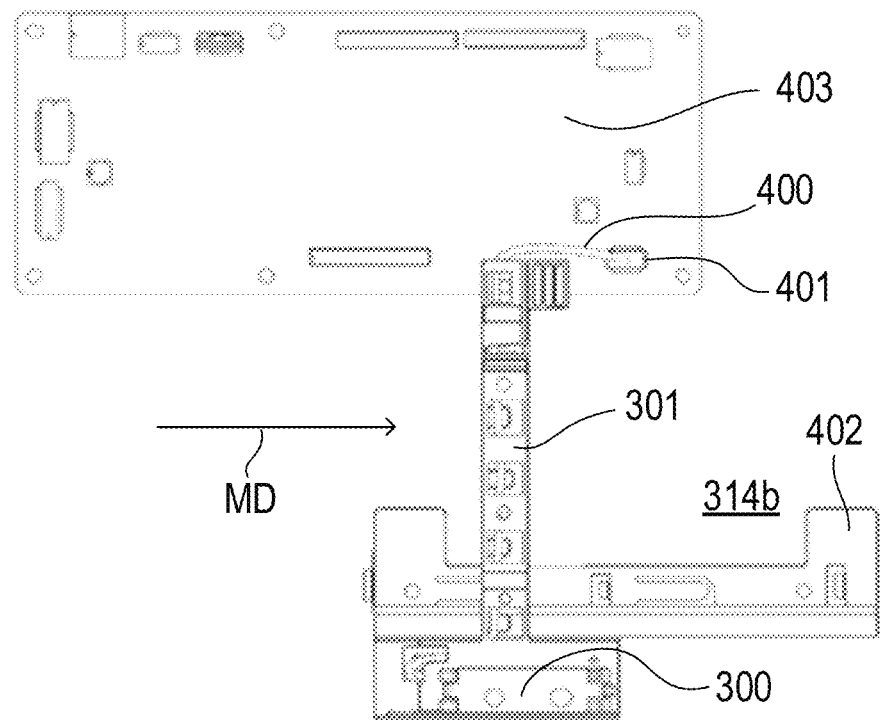
FIG. 11B is a top view for illustrating the holding member and the substrate in the third embodiment.

With reference to FIG. 9 and FIG. 10, a holding member 301 mounted to the image reading apparatus 60 is described. FIG. 11A and FIG. 11B are views for illustrating a relationship among the reflective optical sensor 300, the holding member 301, a guide member 402, and a connector 401 on the substrate 403.

The holding member 301 is a member integrally molded from a resin. At one end portion of the holding member 301, the reflective optical sensor 300 is held. The reflective optical sensor 300 is held by the holding member 301 such that a light emitting portion and a light receiving portion are arranged side by side in the movement direction MD. The other end portion of the holding member 301 extends to an outside of the main body frame 314 through an opening portion 314c (FIG. 7B) formed in the side wall 314a of the main body frame 314. On the bottom portion 314b being a bottom surface of the main body frame 314 in the image reading apparatus 60, the resin-made guide member 402 is mounted. The holding member 301 is allowed to move in the movement direction MD on the bottom portion 314b of the main body frame 314 along the guide member 402 while holding the reflective optical sensor 300.

At the other end portion of the holding member 301, a grip portion 302 (FIG. 11A) is provided, which can be gripped by a user, or an operator, to move the holding member 301 in the movement direction MD. The grip portion 302 has protrusions and recesses which allows the user to easily grip the grip portion. The other end portion of the holding member 301, at which the grip portion 302 is provided, extends to a predetermined space SP on the rear side of the housing (FIG. 10). As illustrated in FIG. 7B, under a state in which the maintenance cover 206 is removed, the user can grip the grip portion 302. That is, the use can move the reflective optical sensor 300 to another position without removing the original platen glass 201.

Figure 12:
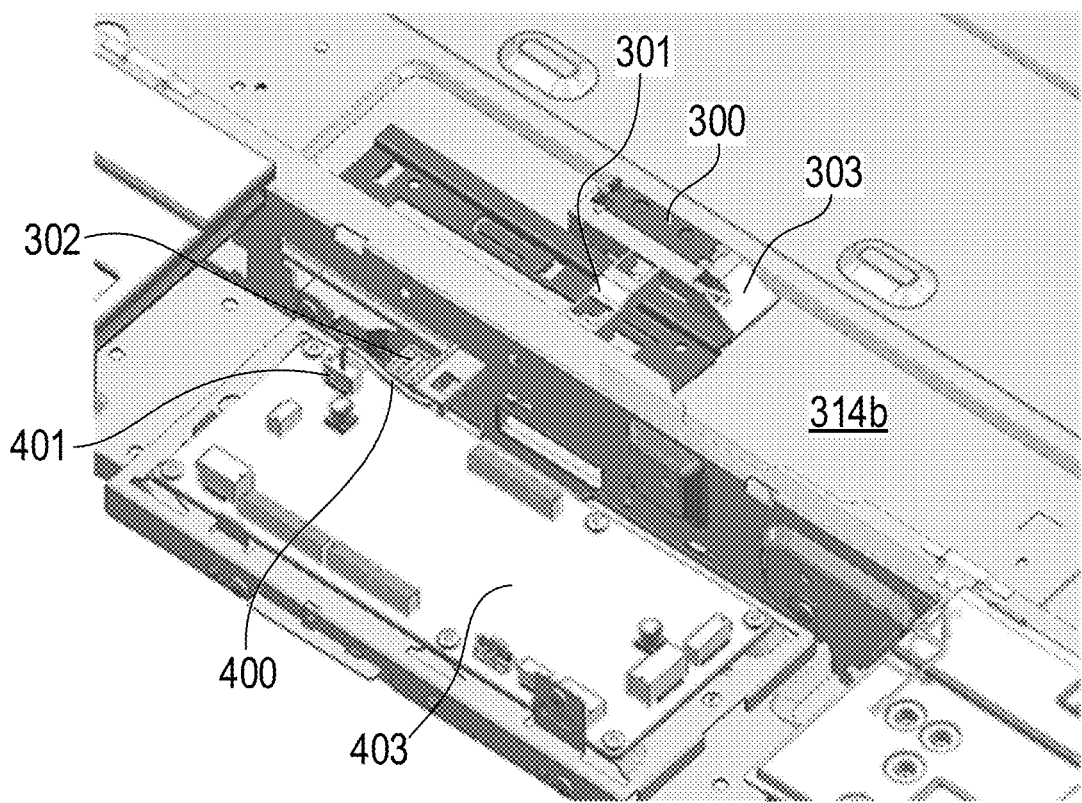
FIG. 12 is a perspective view for illustrating the holding member provided in the image reading apparatus of the third embodiment.

The bottom portion 314b has a mark 451 indicating a position (first position) for identifying the size standards of A series and B series (first size standard) and a mark 452 indicating a position (second position) for identifying the standard of inch series (second size standard) (FIG. 9). The original platen glass 201 is transparent, and hence the user can visually recognize the marks 451 and 452 formed on the bottom portion 314b with ease. FIG. 9 is an illustration of a state in which the reflective optical sensor 300 is located at the position for identifying the size standards of A series and B series. FIG. 10 is an illustration of a state in which the reflective optical sensor 300 is located at the position for identifying the standard of inch series. FIG. 12 is a view for illustrating a state in which the reflective optical sensor 300 is located at the same position as in FIG. 9, as viewed from the rear side.

The user can grip the grip portion 302 to move the holding member 301 to the position of the mark 451 or 452 corresponding to a target size standard for identification, to thereby easily set the reflective optical sensor 300 to a position corresponding to a desired size standard.

Figure 13:
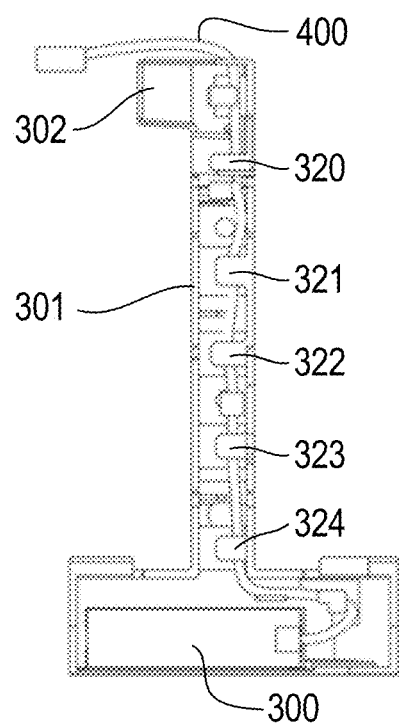
FIG. 13 is a bottom view for illustrating the holding member provided in the image reading apparatus of the third embodiment.
Figure 14:
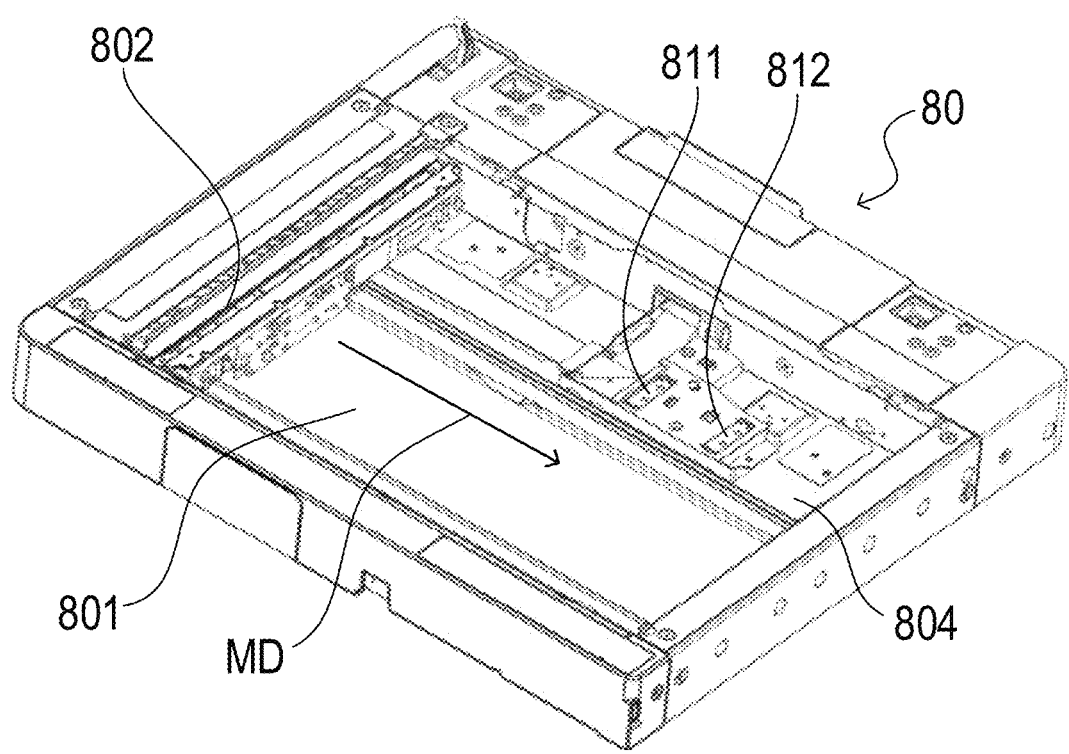
FIG. 14 is a perspective view for illustrating a related-art image reading apparatus.

The connector 401 mounted to the end portion of the cable 400 of the reflective optical sensor 300 is mounted to the substrate 403. FIG. 13 is a bottom view for illustrating the holding member 301 to which the reflective optical sensor 300 and the cable 400 are mounted. The cable 400 is held inside the holding member 301 by claws 320, 321, 322, 323 and 324 being a plurality of guide portions provided on a lower surface of the holding member 301, that is, the bottom surface side of the housing at the holding member 301. With the holding member 301 holding the cable 400 therein as described above, the cable 400 can be also moved along with the movement of the holding member 301. Further, the following situation can be avoided: the cable 400 is brought into contact with the bottom portion 314b to hinder smooth movement of the holding member 301.

Further, the holding member 301 has an inclined portion 303 (FIG. 9 and FIG. 10). The inclined portion 303 is located at the most upstream position of the holding member 301 inside the housing. Further, as illustrated in FIG. 12, the reflective optical sensor 300 is at the highest portion of portions of the holding member 301 along the bottom portion 314b. Accordingly, there is a risk in that, when the scanning unit 202 is moved from the upstream side to the downstream side, the flat cable 330 (FIG. 8) is brought into contact with the reflective optical sensor 300. To address the risk, in this embodiment, the reflective optical sensor 300 has an inclined portion at its upstream portion in the movement direction MD so that movement of the flat cable 330 is less liable to be hindered.

In the first embodiment to the third embodiment described above, the image reading apparatus 10, 20, 30, 40, 50 and 60 in which the scanning unit 202 as illustrated in FIG. 1B moves in the movement direction MD are adopted. It is also possible to adopt an image reading apparatus in which the image sensor 211 is secured in a predetermined position in the housing, and the light source 208 and the reflecting mirror 209 are moved, instead of the scanning unit 202.

According to the embodiments, a sensor, which is provided in a housing and is configured to detect presence or absence of an original in a predetermined position on an original platen to identify a size of an original, may be easily arranged in another position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An original reading apparatus, comprising:
an original platen on which an original is to be placed;
a reading unit configured to read the original placed on the original platen while moving in a predetermined direction in a housing, the original platen being mounted to the housing;
a sensor, which is provided in the housing, and is configured to detect presence or absence of the original on the original platen to identify a size of the original; and
a holding member configured to hold the sensor and a cable extending from the sensor, the holding member being movable in the housing in the predetermined direction, and the holding member being movable to a first position for identifying a first size standard and to a second position for identifying a second size standard,
wherein a grip portion used by an operator to move the holding member in the predetermined direction is provided at one end of the holding member, the one end extending to a predetermined space through an opening portion in a wall on a rear side of the housing, the predetermined space being located on a rear side of the wall and a rear side of the original platen, the predetermined space being covered by a cover member,
wherein when the cover member is removed, the grip portion is exposed, and
wherein the cable extends from the one end of the holding member to the predetermined space.

2. The original reading apparatus according to claim 1, wherein the housing has a mark indicating the first position and a mark indicating the second position.

3. The original reading apparatus according to claim 1, further comprising a guide member provided at a bottom surface of the housing and configured to guide movement of the holding member in the predetermined direction.

4. The original reading apparatus according to claim 1, wherein the holding member includes a plurality of guide portions configured to hold the cable inside the holding member and guide the cable from the sensor to the predetermined space.

5. The original reading apparatus according to claim 4, wherein the plurality of guide portions are provided on a bottom surface side of the housing at the holding member.

6. The original reading apparatus according to claim 4, wherein the holding member is a member integrally molded from a resin.

7. The original reading apparatus according to claim 1, wherein the holding member is configured to hold the sensor at an other end.

8. The original reading apparatus according to claim 1, wherein the holding member is provided along the wall and a bottom surface of the housing.

9. An original reading apparatus, comprising:
an original platen on which an original is to be placed;
an illumination unit configured to irradiate the original placed on the original platen with light while moving in a predetermined direction in a housing, the original platen being mounted to the housing;

an image sensor configured to read the original;

a size detection sensor, which is provided in the housing, and is configured to detect presence or absence of the original on the original platen to identify a size of the original; and a holding member configured to hold the size detection sensor and a cable extending from the size detection sensor, the holding member being movable in the housing in the predetermined direction, and the holding member being movable to a first position for identifying a first size standard and to a second position for identifying a second size standard, wherein a grip portion used by an operator to move the holding member in the predetermined direction is provided at one end of the holding member, the one end extending to a predetermined space through an opening portion in a wall on a rear side of the housing, the predetermined space being located on a rear side of the wall and a rear side of the original platen, the predetermined space being covered by a cover member, wherein when the cover member is removed, the grip portion is exposed, and wherein the cable extends from the one end of the holding member to the predetermined space.

10. The original reading apparatus according to claim 9, further comprising a guide member provided at a bottom surface of the housing and configured to guide movement of the holding member in the predetermined direction.

11. The original reading apparatus according to claim 9, wherein the holding member is provided along the wall and a bottom surface of the housing.

* * * * *